United States Patent [19]

Joppeck

[11] Patent Number: 5,535,866
[45] Date of Patent: Jul. 16, 1996

[54] MODULAR ROLLER CLUTCH CAGE

[75] Inventor: Dwayne P. Joppeck, Canton, Mich.

[73] Assignee: General Motors Corporation, Detroit, Mich.

[21] Appl. No.: 391,792

[22] Filed: Feb. 21, 1995

[51] Int. Cl.$^6$ .................................................. F16D 15/00
[52] U.S. Cl. ........................ 192/45; 188/82.84; 384/572; 403/329
[58] Field of Search ................... 192/41 R, 45; 188/82.84; 384/559, 560, 572, 576, 578; 403/331, 326, 327, 329, 319

[56] References Cited

U.S. PATENT DOCUMENTS

| | | | |
|---|---|---|---|
| 4,019,298 | 4/1977 | Johnson | 403/331 X |
| 4,054,192 | 10/1977 | Johnson | 192/45 |
| 4,570,762 | 2/1986 | Husmann | 188/82.84 |
| 4,679,676 | 7/1987 | King et al. | 192/45 |
| 4,821,856 | 4/1989 | Lederman | 192/45 |
| 4,924,981 | 5/1990 | Johnston et al. | 192/45 |
| 5,033,876 | 7/1991 | Kraus | 384/572 |
| 5,046,229 | 9/1991 | Lederman | 29/418 |
| 5,062,512 | 11/1991 | Lederman | 192/45 |

*Primary Examiner*—Charles A. Marmor
*Assistant Examiner*—Saul Rodriguez
*Attorney, Agent, or Firm*—Patrick M. Griffin

[57] ABSTRACT

A segmented roller clutch cage is comprised of loose jointed modules that combine good clutch race conformance with easy assembly, as well as allowing for selective module disassembly axial parting motion.

Each of a plurality of separately molded elements is joined to the next with identical male and female fasteners that fit together with a simple straight line push, along the cage axis. A slide and rail combination on one end of each module fits into matching grooves on the other end of each module. The grooves are created by undercut, radially opposed beam pairs, the radially outboard one of which is more flexible. A barb on the slide-rail unit is designed to snap or latch past the flexible beam. The slide and rail fit into the grooves with enough clearance to give freely expanding and contracting joints, so that between race conformance is very good. The joints may even be disassembled with a compound radial bending and axial parting motion.

3 Claims, 7 Drawing Sheets

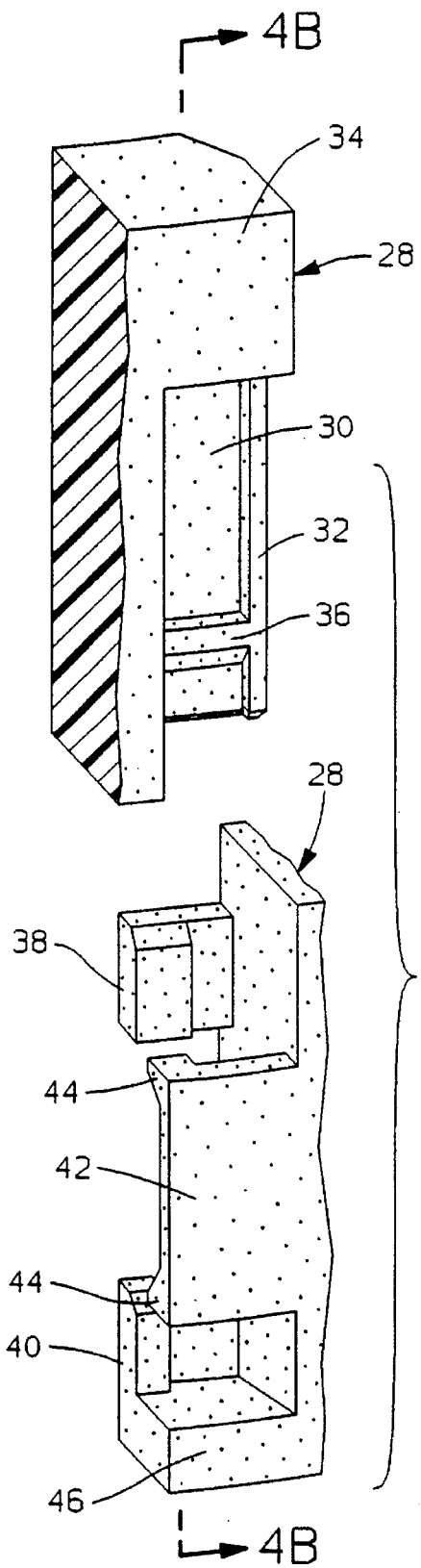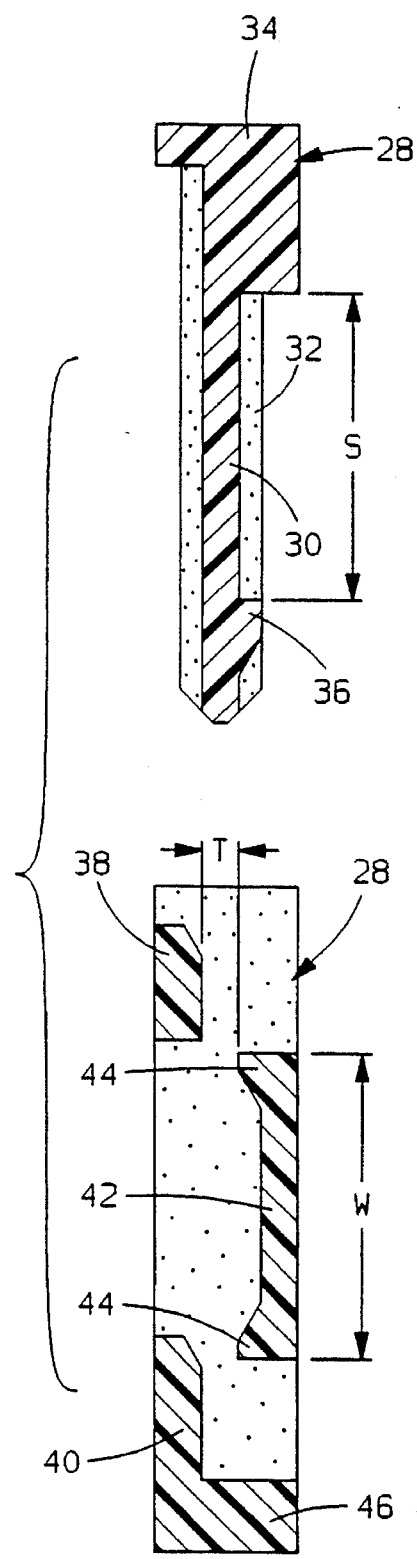
FIG. 4A
FIG. 4B

MODULAR ROLLER CLUTCH CAGE

This invention relates to roller clutch cages in general, and specifically to a segmented cage that is assembled from a plurality of identical modules with free moving joints that provide improved conformance between the roller clutch races.

BACKGROUND OF THE INVENTION

Roller clutch cages provide a structural frame work that holds a plurality of rollers and springs together, both during operation of the clutch between a pair of clutch races, and during shipping, handling and installation operations. Each of a plurality of generally rectangular pockets within the cage retains a roller and spring, and the cage retains the pockets together. The structural performance of the cage is most critical during handling and installation, since the rollers and springs must resist strong dislodging forces. After installation, the rollers are completely radially retained between the clutch races, and float to an equilibrium circumferential position, under the force of its energizing spring. The cage and pocket side rails are still needed to locate and retain the rollers axially, however.

One of the most critical aspects of cage operation after installation is its conformation, meaning its ability to match itself to and within the generally annular space between the races, without binding on either one. This is especially true when the cage is molded plastic, as it typically is in newer designs. Plastic will both shrink and expand more rapidly than the surrounding steel clutch races as the temperature falls and rises, potentially binding or buckling. An older patented design, assigned to the assignee of the current invention, provides excellent conformation, but is expensive to produce because it requires slow, painstaking hand assembly. As disclosed in U.S. Pat. No. 4,054,192, the clutch cage is built up from a plurality of separately molded segments that are snap fitted together end to end with a radially directed pushing motion. The snap force is high, but, once snap fit is achieved, it has a degree of deliberate looseness or rattle built in at each joint. This allows the segments to shift freely back and forth circumferentially, within limits. Very good between race conformation is thereby achieved, but the force necessary to snap the segments together prevents easy disassembly later, if it is desired to replace one or more segments. The complex assembly motion is not one that could be easily adapted to machine methods. One piece, solid cage designs provide slots or other "flexible" junctures between pockets that allow the cage to stretch or shrink, and will work in many situations, much more cheaply. All one piece designs are inherently stiffer and less conformable than a segmented, loosely jointed design, however.

SUMMARY OF THE INVENTION

The subject invention provides a modular loose jointed, highly conformable roller clutch cage design that is simpler to assemble. In addition, in the embodiment disclosed, an individual module can be easily removed and replaced. A pair of complexly shaped, but easily molded, male and female fasteners are engaged with a simple axial motion. They may also be deliberately disengaged with a combined radial bending and axial sliding motion.

In the embodiment disclosed, each module is generally an annular segment, with a male fastener at one end and female fastener at the other. The male fastener includes a radially thin, but stiff, slide near the end of the module integrally molded to a thicker, parallel rail spaced farther from the end of the module. The slide carries a barb of comparable thickness to the rail, inboard of the rail. The rail extends axially for most of the width of the module, while the barb is axially discontinuous and short. The female fastener includes two short, stiff, axially spaced beams at the radially inner diameter of the module, and a longer, more flexible beam at the radially outer diameter of the module, located axially between the other two beams. The beams are undercut so as to create a groove that freely receives the slide and rail, but not the barb. The modules are assembled together by sliding the respective fasteners axially together, one after the other. The slide and rail can move axially freely between the beams. The barb, however, hits and flexes the longer beam radially out of the way, which snaps back as the modules move into final axial alignment. The simple, straight line assembly motion is well adapted to machine assembly.

After assembly, each slide and rail is trapped radially, circumferentially, and axially within the beams, securely enough to prevent dislodging before or after cage installation. A deliberate radial and circumferential clearance between the slide-rail and beams provides for loose jointed, excellent conformation of the cage between the races after installation. Should it be desired to disassemble and replace a single module, this may be done by bending the ends of the adjacent modules down and radially out, thereby causing the rails to pry the beams apart far enough to clear the barb. Then, the selected module can be slid axially out. The disassembly feature does not threaten ordinary operation, since the compound bending and sliding motion necessary has to be deliberately carried out.

DESCRIPTION OF THE PREFERRED EMBODIMENT

These and other features of the invention will appear from the following written description, and from the drawings, in which:

FIG. 4A is a perspective view of the male and female fasteners beginning to move axially together;

FIG. 4B is a corresponding sectional view taken along the line 4B of FIG. 4A;

Figure 1:
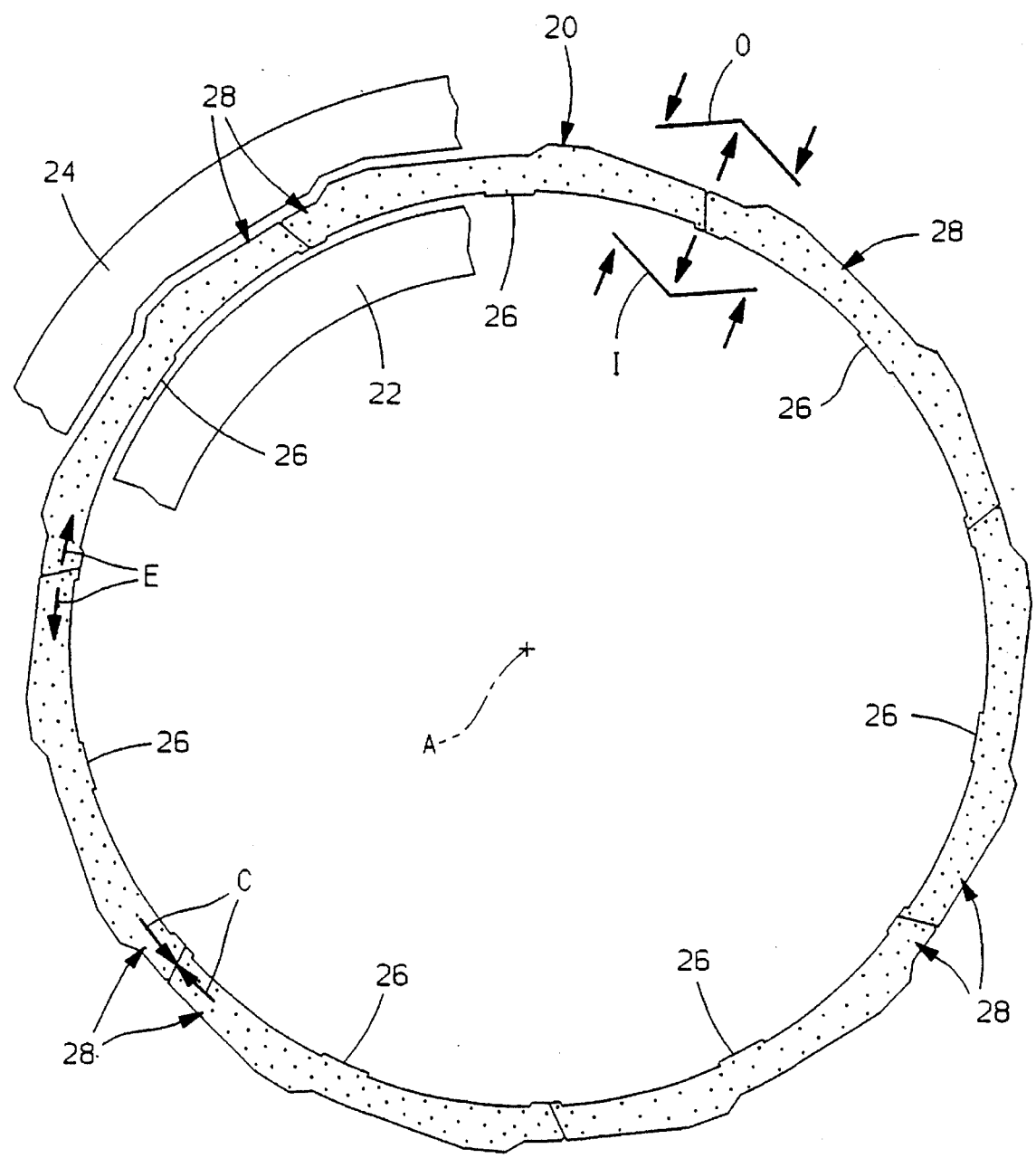
FIG. 1 is an axial view of the cage of the invention installed between a pair of partially depicted races.

Referring first to FIG. 1, a molded plastic roller clutch cage according to the invention, indicated generally at 20, is installed in the annular space between a pair of clutch races 22 and 24, the axis of which is indicated at A. Cage 20 is a concentricity control cage, meaning that it has integral journal blocks 26 that fit closely within the annular space and keep the races 22 and 24 substantially concentric. As a consequence, it is especially important that the close fitting plastic cage 20 have good conformance within the annular space, because of the plastic-steel temperature response differential described above. Cage 20 is able to expand and contract freely, because it is built up from a series of seven identical separate modules, indicated generally at 28, which have joints that give with essentially no resistance, within limits, so as to accommodate expansion and compression forces. Details of the modules 28 and the forces between them are described in more detail below.

Figure 2:
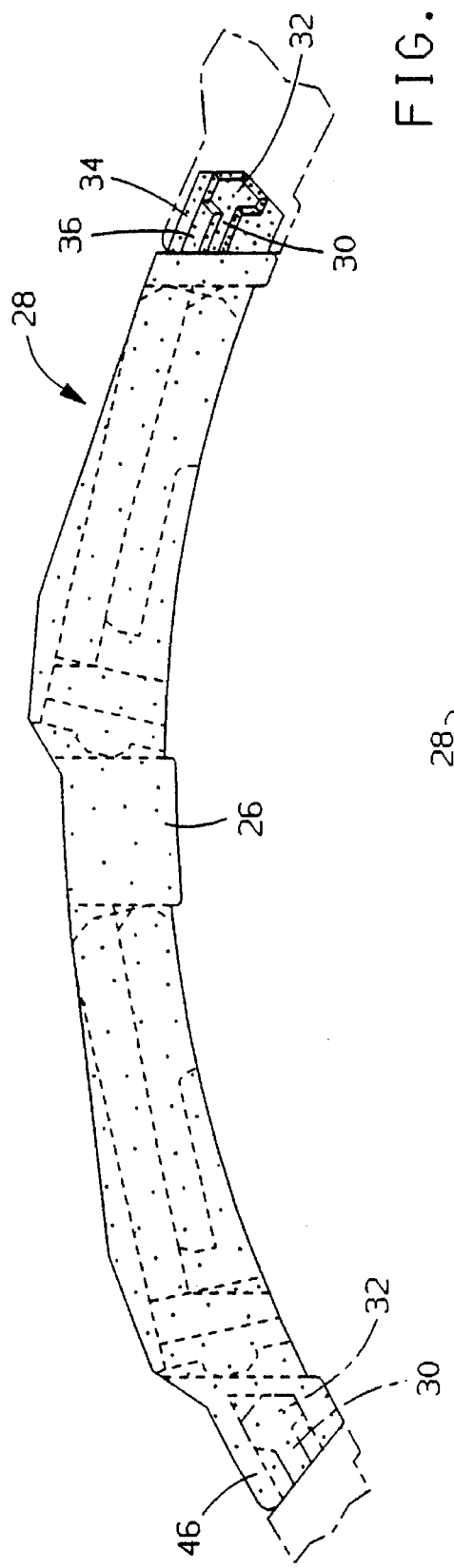
FIG. 2 is an enlarged view of one module viewed axially.
Figure 3:
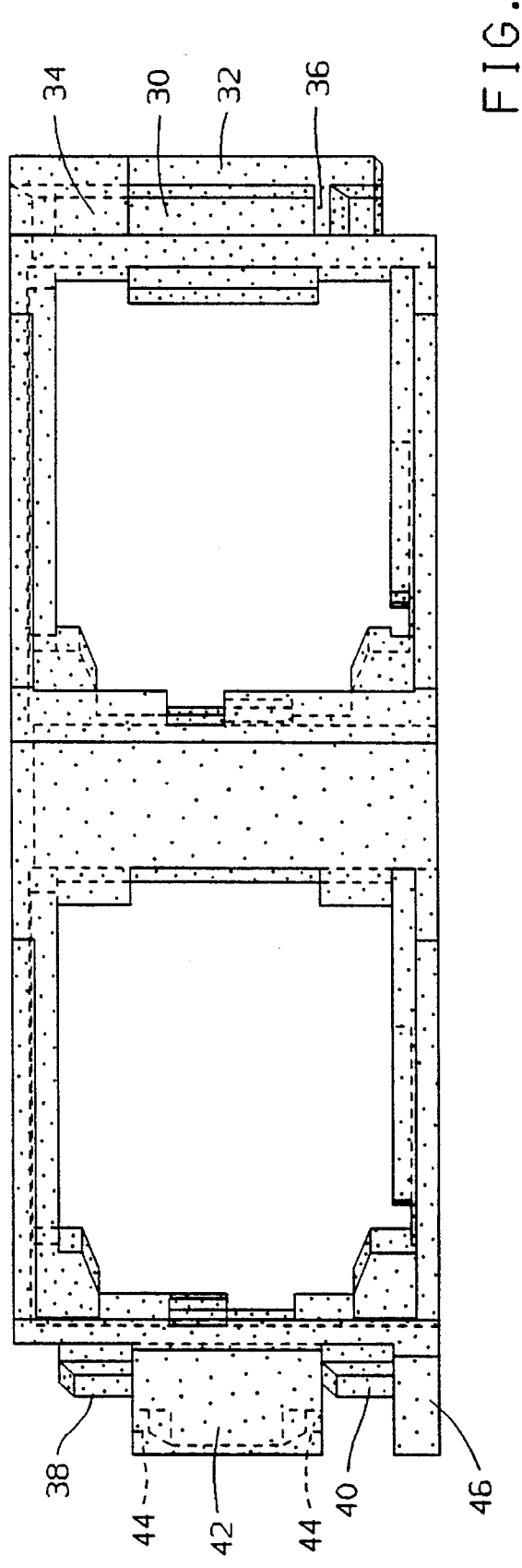
FIG. 3 is a view looking radially inwardly at one module alone.
Figure 5A:
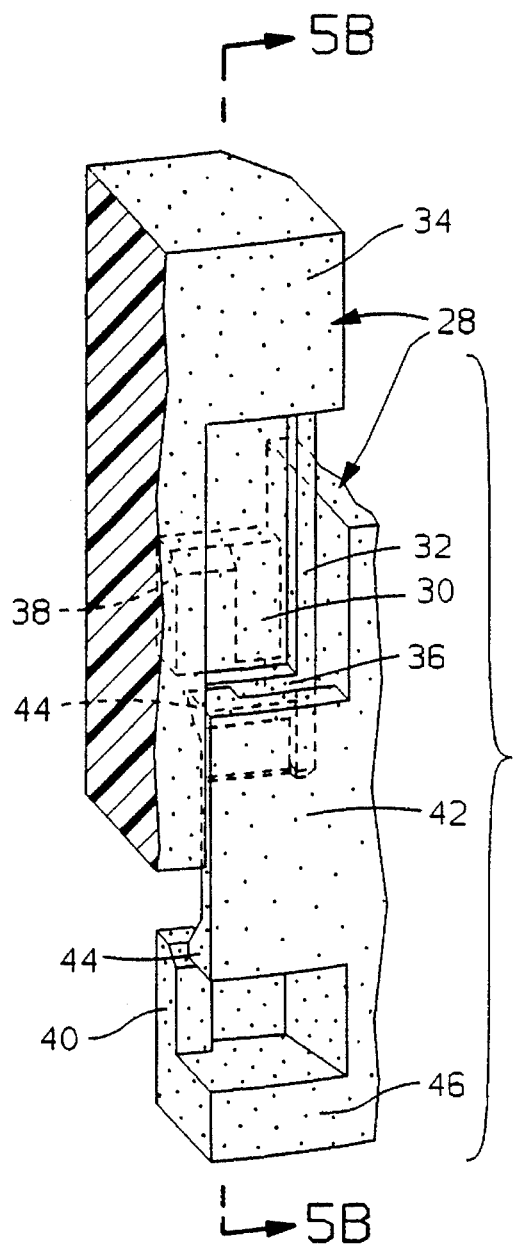
FIG. 5 is a perspective view of the fasteners moved partially together, with the slide barb having pried the beams apart.
FIG. 5B is a corresponding sectional view taken along the line 5B of FIG. 5A.
Figure 5B:
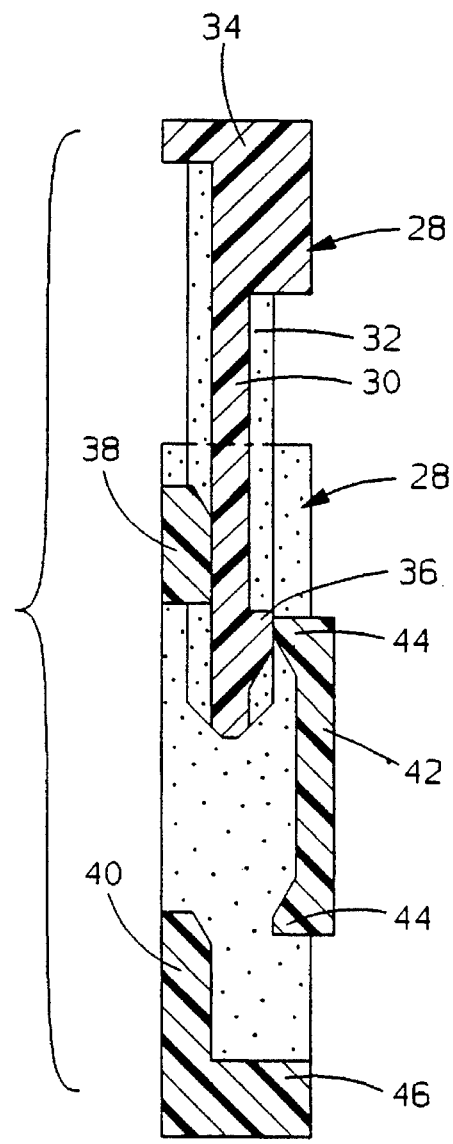

Referring next to FIGS. 1 and 2, each module 28 subtends an equal angular segment of the annular space between the races 22 and 24. The joints between adjacent modules 28 are subject to various forces, before and after installation. Should cage 20 be expanded outwardly, all the inter module joints are subject to being pulled apart, as shown by the arrows labeled E. If subjected to compression, then the joints would be pushed together, as indicated by the arrows C. Regular, even expansion and compression forces may be experienced by cage 20 in operation, due to the kind of thermal expansion and contraction noted above. During shipping and handling, cage 20 is likely to be subjected to uneven expansions and contraction, of a type that would tend to force it into an elliptical shape. In that case, the inter module joints may be subjected to inward bending forces, as shown by the angle and arrows labeled I, or outward bending forces, labeled O. The fasteners that make up the joints between the modules 28, described next, accommodate all of these forces, while allowing for simple assembly, and also for deliberate disassembly.

Referring next to FIGS. 2 through 4B, each module 28 provides two roller pockets, for a total of fourteen conventional rollers and springs, not illustrated. The total number of rollers needed in any particular case depends on the loads that the races 22 and 24 must handle, and the number of cage modules 28 in turn, depends on how many joints are needed to give a sufficient total expansion and contraction capacity to cage 20. The rollers are simply divided evenly among the number of modules 28. Clearly, if the roller complement were a prime number, one of the modules 28 would have to accommodate a single roller, and would not match the others in size (unless all were made to accommodate a single roller). The fasteners would be identical regardless. Each module 28 has, at one end, a male fastener comprised of a circumferentially extending slide 30 and a coextensive rail 32. The slide 30 and rail 32 extend for most of the axial width of the end of module 28, terminating at a block 34 that is radially as thick as a journal block 26. Slide 30 is radially much thinner than block 34, and approximately radially centered relative to it, while rail 32 is intermediate in thickness. This creates a general "T" shape, as viewed axially from the perspective of FIG. 2. Slide 30 is short enough, circumferentially, that it is relatively stiff in the radial direction, a stiffness assisted by its integration to the block 34. Molded to the outer surface of slide 30 and inboard of rail 32 is an axially extending barb 36 that is radially thicker than slide 30 and comparable in thickness to rail 32. Barb 36 is axially narrow, and axially spaced from the end of block 34 by the distance indicated at S.

Still referring to FIGS. 2 through 4B, the opposite end of each module 28 comprises a female fastener in the form of three circumferentially extending beams, including two axially spaced beams 38 and 40 at the radially inner diameter and an intermediate beam 42 at the radially outer diameter. In the axial direction, beam 42 has a width W that is substantially equal to the quantity S noted above. In the circumferential direction, beam 42 is somewhat longer than the beams 38 and 40. It is also, therefore, more radially flexible, in the way that a longer cantilever beam is more flexible. Beam 42 is longer in part because of the fact that it is located radially farther out than the beam pair 38, 40, but mostly because the end of module 28 is cut back from a purely radial plane, giving it more space. In terms of the fastening operation, the beam pair 38 and 40 act as a single, axially continuous beam, but are axially spaced and separate here for a reason described below. The beams 38 and 40 are radially undercut enough to match and slightly exceed the thickness of rail 32, effectively forming, in cooperation with the radially opposed beam 42, an axially extending groove. The outer edge of the intermediate beam 42 is molded with a pair of axially spaced teeth 44 which are radially spaced from the outer edges of the opposed beam pair 38, 40 by a distance T that is slightly greater than the radial thickness of the slide 30, but less than the radial thickness of the barb 36. Adding to the radial stiffness of the beam 40 is an integrally molded block 46 of comparable thickness to block 34.

Figure 6A:
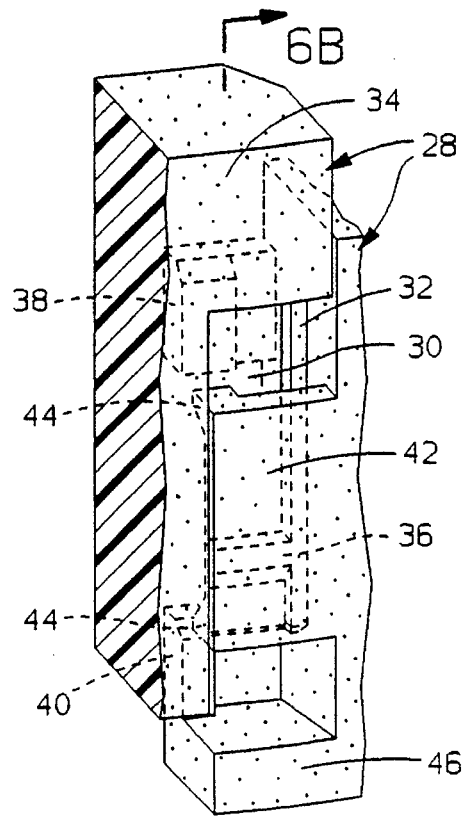
FIG. 6A is a perspective view of the fasteners moved farther together.
Figure 6B:
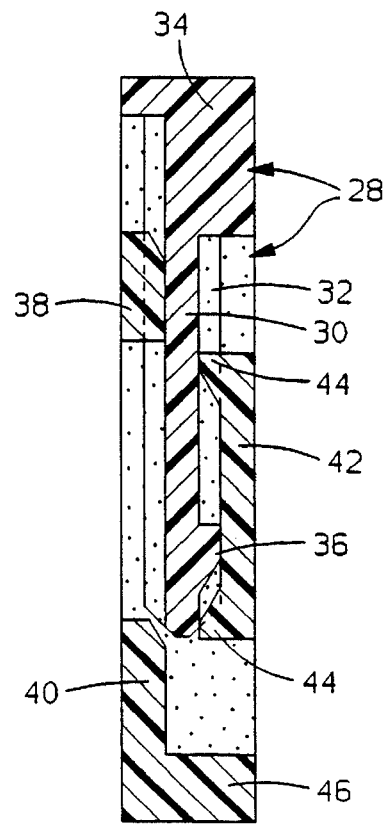
FIG. 6B is a corresponding sectional veil taken along the line 6B of FIG. 6A.
Figure 7A:
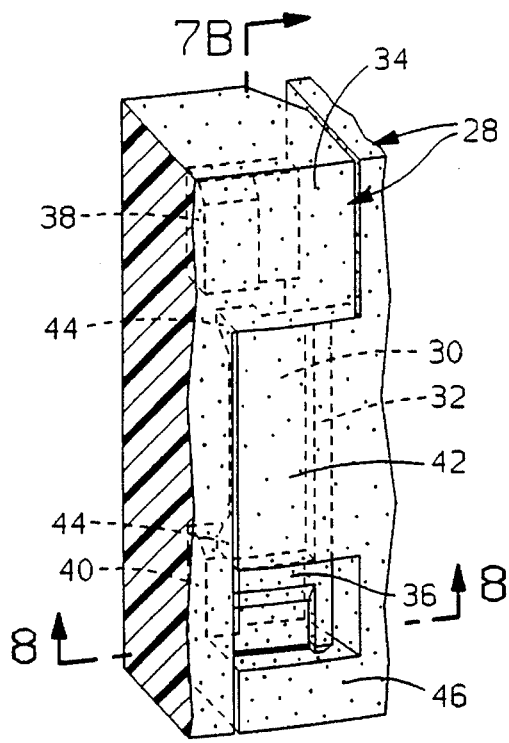
FIG. 7A is a perspective view of the fasteners moved completely together and fully engaged.
Figure 7B:
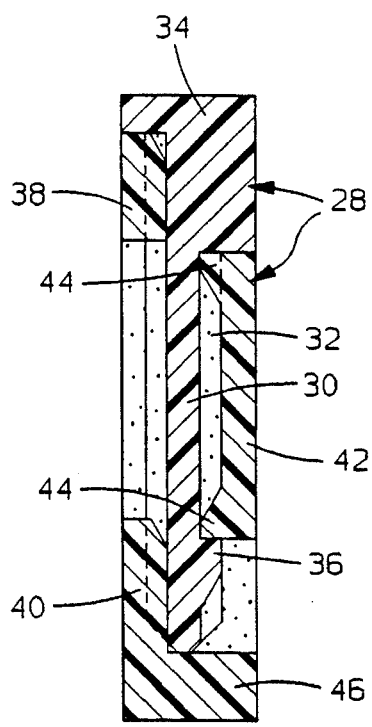
FIG. 7B is a corresponding sectional view taken along the line 7B of FIG. 7A.

Referring next to FIGS. 4A through 6B, the assembly of the modules 28 one to another is illustrated. Assembly consists simply of axially pushing the end of each module 28 into axial alignment with the end of the next, seriatim. The last module 28 is assembled with the same basic motion, the only difference being that it will fill the last gap, and slide into the ends of two adjacent modules simultaneously. The straight line pushing motion is simple and amendable to machine or robot assembly, unlike the more complex radial assembly motion of the older segmented cage design described above. Specifically, as one module 28 is pushed into axial alignment with the other, the slide 30 and rail 32 simultaneously slide between the co linear beam pair 38,40 and opposed beam 42, which engage opposite radial sides thereof. As seen in FIGS. 5A and 5B, the barb 36 initially wedges between beam 38 and the first tooth 44, flexing the longer beam 42 radially outwardly. The shorter beam 38 may be flexed radially inwardly to a small extent, as well. Then, as seen in FIGS. 6A and 6B, the barb 36 snaps past the first tooth 44 and slides with lower resistance thereafter along the surface of beam 42 until it hits the second tooth 44. Then, it wedges between the last tooth 44 and the last beam 40, finally snapping into place behind beam 42, specifically, behind the last tooth 44, as seen in FIGS. 7A and 7B. The two modules 28 cannot be pushed any farther together, because the blocks 34 and 46 simultaneously abut the beam 42 and the end of slide 30-rail 32 respectively. Once installed, the blocks 34 and 46 also assist in the concentricity control function provided by the journal blocks 26, being of comparable radial thickness. The assembled modules 28 cannot be pulled axially apart, because the backside of barb 36 is abutted with one of the teeth 44, although deliberate disassembly is possible with a more complex motion, as described further below. This axial fit up is close enough that there is insignificant axial shifting possible between the assembled modules 28. A limited radial and circumferential shifting is deliberately made possible, however, as described next.

Figure 8:
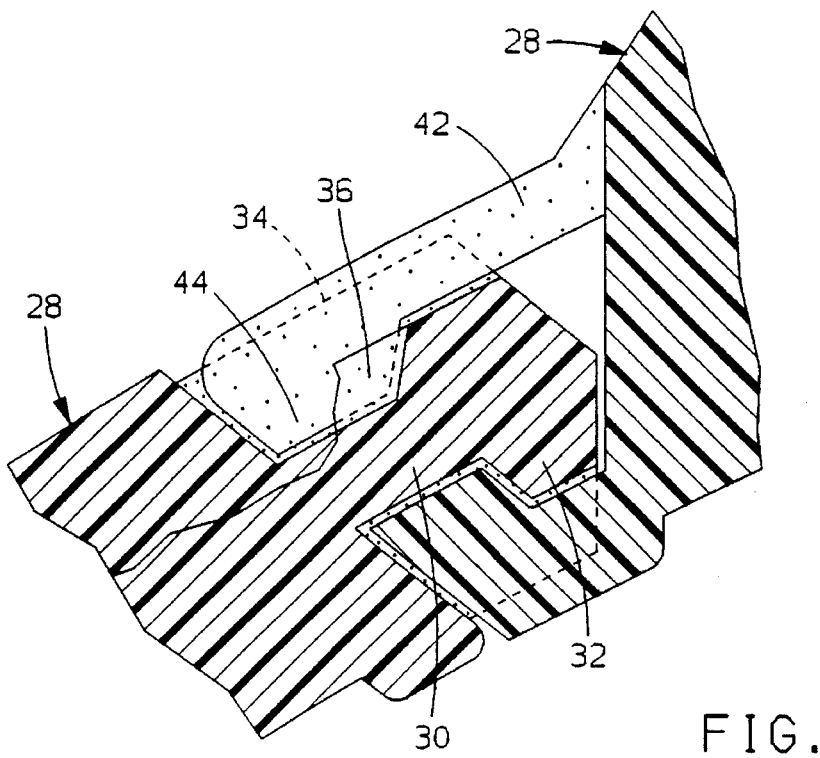
FIG. 8 is a sectional view taken along the line 8—8 of FIG. 7A, showing the mutual clearance between the various elements of the engaged fasteners when there is no net force acting on the joint between adjacent cage modules.
Figure 9:
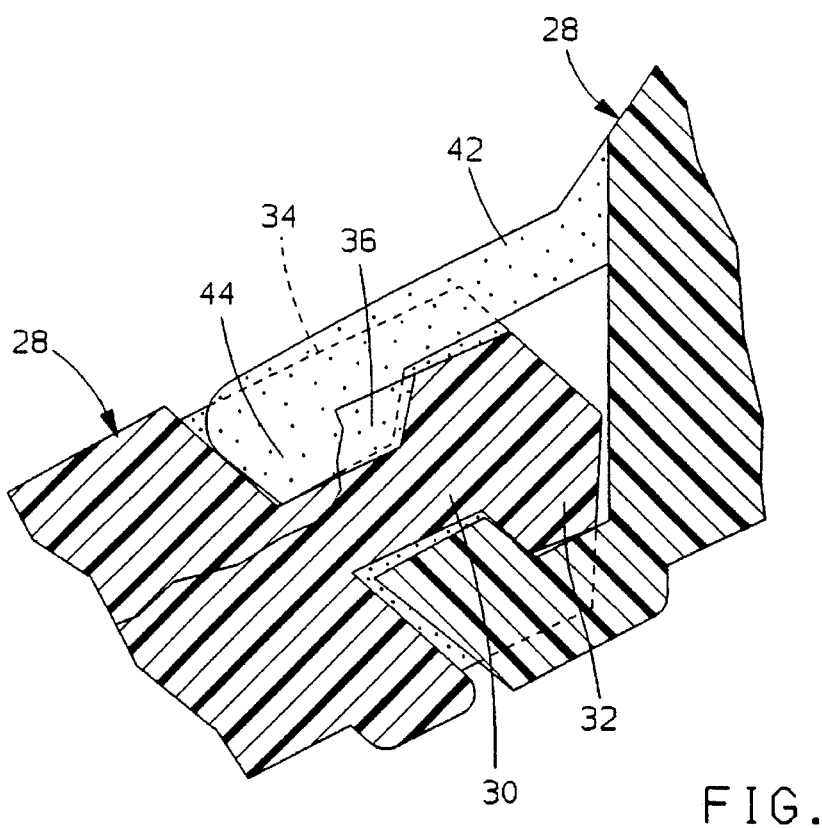
FIG. 9 is a view like FIG. 8, but showing the response of the fasteners to an inward bending on the joint.
Figure 10:
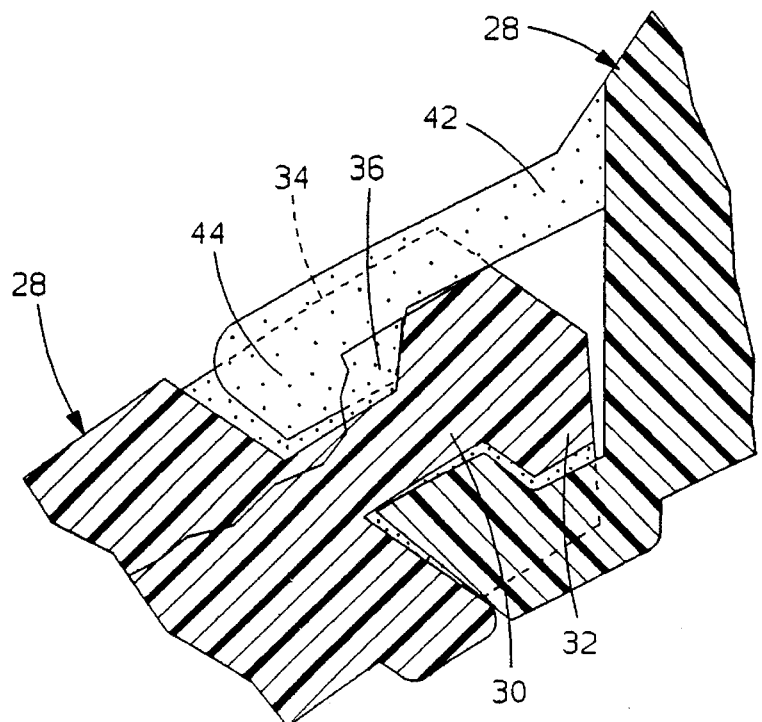
FIG. 10 is a view like FIG. 8, but showing the response of the fastener as to an outward bending on the joint.

Referring next to FIG. 1, and to FIGS. 8 through 10, the response of the assembled cage 20 to circumferential and radial forces is illustrated. As best seen in FIG. 8, the cross sectional shape of the rail 32 and slide 30 is deliberately undersized relative to the receiving groove created by the undercut beams 38, 40 and the overhanging teeth 44. Here, that clearance averages approximately two to four thousandths of an inch, circumferentially and radially. Should the cage 20 experience a post installation expansive force, as with a temperature rise, then each rails 32 can pull to the left as seen in FIG. 8, freely and without resistance, but only until the circumferential clearance noted above is gone, and it hits the undercut beams 38 and 40 and the overhanging teeth 44. Seven times that individual circumferential clearance is sufficient to allow cage 20 to expand as much as is necessary to conform to the annular space between the races 22 and 24. Likewise, in the event of a contractive force, the rail 32 can move the right to the same degree. Because of these free moving clearances in the joints, the modules 28 can also respond freely to pre installation inward and outward bending forces, but still within limits. As seen in FIG. 9, which illustrates an inward bending force, rail 32 and slide 30 can twist inwardly, but only until they jam between the beam pair 38, 40, and the beam 42. Conversely, if subjected to outward bending forces, as shown in FIG. 10, rail 32 and slide 30 bend outwardly. This creates a leverage about the fulcrum of the stiffer, radially inner beams 38 and 40 and against the radially outer beam 42. Normal shipping and handling forces are not sufficient to bend beam 42 out enough to allow the rail 32 to pull out, however. Therefore, the various modules 28 of cage 20 have sufficient integrity to constitute a structural unit, but can move almost freely after installation as structurally separate elements.

Figure 11:
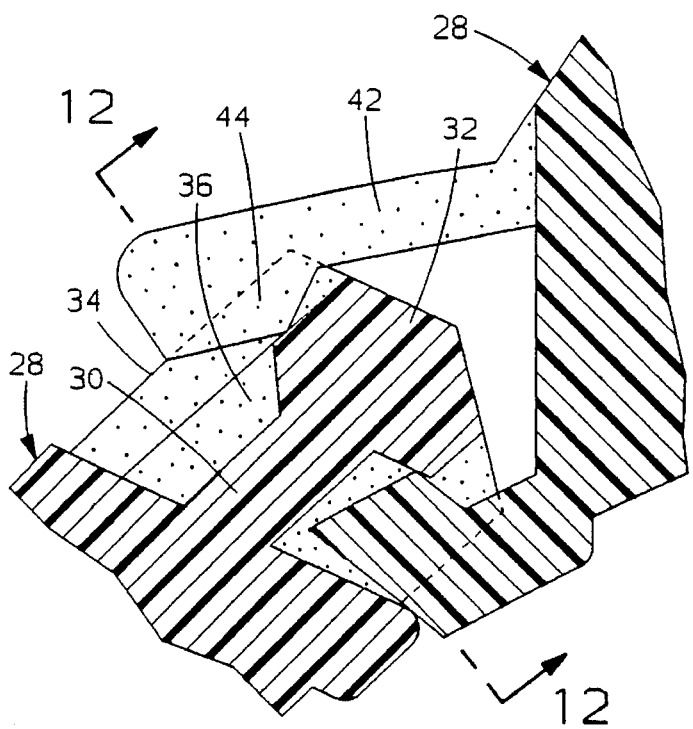
FIG. 11 is a view like FIG. 10, but illustrating a greater, deliberate outward bending on the joint pursuant to disassembly of a module.
Figure 12:
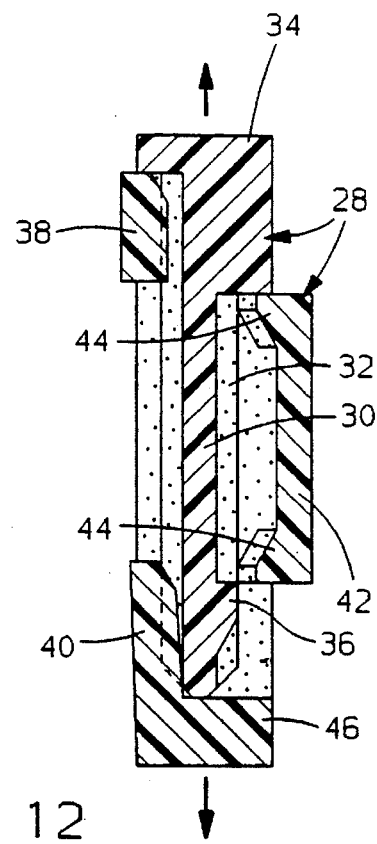
FIG. 12 is a corresponding sectional view taken along the line 12—12 of FIG. 11.

Referring next to FIGS. 11 and 12, an additional advantage of the inter module fastening system is illustrated. It is possible to disassemble a selected module 28 (or more) by applying a specific compound force. A strong outward bending force is applied across the joints of the selected module 28 (only one of which is illustrated), which acts to pry the more radially flexible beam 42 radially out and away from the beams 38 and 40. Because of the relatively greater stiffness of the shorter, thicker beams 38 and 40, especially 40, the bending force affects the beam 42 preferentially, prying it out and away. The rail 32 can rock out and around the stiffer beams 38 and 40, far enough that the barb 36, which is inboard of the rail 32, moves circumferentially away from, and is no longer blocked by, the tooth 44. The prying apart action is not enough to let rail 32 pull completely out. It need only be great enough to allow the barb 36 to clear the teeth 44 on beam 42. Then, while maintaining the bent out relationship, the selected module 28 can be pulled out by applying an axial parting force as shown by the arrows in FIG. 12. Most likely, it would be difficult to disassemble the selected module just one end at a time, especially if cage 20 had a significant axial width, because it would be difficult to twist cage 20 out of shape far enough to allow a single joint to be slide axially apart. However done, the simultaneous application of the prying and axial parting forces, which are orthogonal to one another, can only be done deliberately. It would be difficult to automate such a complex motion, but that would be unnecessary. Disassembly of a single module 28 would most likely be done manually, as a post installation service operation. It provides the opportunity to repair only selected segments of the clutch cage 20, rather than the entire unit, which represents a potentially significant cost savings, especially with large diameter units having many segments. Replacement modules would be installed in the same way described above.

Variations in the embodiment disclosed could be made. Fundamentally, if the only need were for a free jointed, segmented cage in which the modules could be easily assembled, with no need for later disassembly, then the fastening system would not need to be made reversible. The barb 36 could then be placed anywhere where it would snap past the flexible beam 42. It would not necessarily have to be placed on the slide 30, inboard of the rail 32, so that it could rock out of interference with the tooth 44. As disclosed, the radially outer beam 42 is the one that is made the more radially flexible, to that module disassembly is accomplished by a radially outward bending force, in order to pry the flexible beam 42 radially out. That could theoretically be reversed, with the more flexible beam being on the radially inner diameter, and with disassembly being accomplished by a radial inward bending. So long as the beam past which the barb snaps is the more flexible (as a result of being longer or thinner), the basic latching and de latching can be accomplished.

While the shape and inter relationship of the various fastener elements and surfaces is very complex, their manufacture is potentially quite simple. The primary purpose of the fastener shapes described is to improve conformance, assembly, and disassembly, but their moldability is an added advantage. As disclosed, the various surfaces are shaped and arranged so that each module 28 can be molded by a single pair of mold elements that part along a common direction that is generally radial, thereby obviating the need for any separately movable mold slides or inserts. For example, the lack of axial overlap between the axially spaced beam pair 38 and 40 and opposed beam 42 is specifically intended to allow them to be molded with an effective radial undercut, by generally radially parting mold elements. Likewise, no surface of the rail 32 overlays the slide 30. The beam pair 38 and 40 could be one continuous beam, if the module 28 were instead molded with a pair of mold elements that parted axially. In that case, an access slot would have to be provided through the block 34 in order for a very thin mold element to slide axially through (and back) to create the back surface of barb 36. In addition, it would not be possible to mold the discrete teeth 44, since, as viewed axially, they radially overlap one another. That would not effect the basic operation of the latching mechanism, but there would be more resistance felt when pushing the barb through. The main factor driving a choice between an axial or radial mold parting direction is whether it is desired to make the sides of the roller pockets radially continuous. If so, radial parting, as here, is necessary. Therefore, it will be understood that it is not intended to limit the invention to just the embodiment disclosed.

The embodiments of the invention in which an exclusive property or privilege is claimed are defined as follows:

1. A modular roller clutch cage that self conforms within an annular space between a pair of clutch races and which may be easily assembled, comprising, a plurality of interlocking modules, each module comprising generally a segment of said annular space, each module having a male fastener at one end and a female fastener at the other, each fastener on each module being mutually axially insertable to the mating fastener on each adjacent module, each male fastener comprising a radially stiff slide extending circumferentially from one end of each module, an axially extending, radially thicker rail circumferentially spaced from said module one end and parallel to said slide, and an axially discontinuous barb, each female fastener comprising a pair of undercut beams extending circumferentially from the other end of said module and spaced radially apart by less than the thickness of said slide barb, one of which is radially stiffer and the other radially flexible, said beams being inter engageable with opposite radial sides of said slide and rail with a slight circumferential and radial clearance, whereby, each module may be assembled to the other by axially inserting each male fastener slide and rail between each pair of female fastener beams, thereby flexing said beams apart as said barb moves axially past and behind said flexible beam, thereby capturing said slides between said beams with sufficient radial and circumferential clearance to allow said modules to conform to said annular space.

2. A modular roller clutch cage that self conforms within an annular space between a pair of clutch races and which may be easily assembled and disassembled, comprising, a plurality of interlocking modules, each module comprising generally a segment of said annular space, each module having a male fastener at one end and a female fastener at the other, each fastener on each module being mutually axially insertable to the mating fastener on each adjacent module, each male fastener comprising a radially stiff slide extending circumferentially from one end of each module, an axially extending, radially thicker rail circumferentially spaced from said module one end and parallel to said slide, and an axially discontinuous barb on said slide that is radially thicker than said slide, each female fastener comprising a pair of undercut beams extending circumferentially from the other end of said module and spaced radially apart by less than the thickness of said slide barb, one of which is radially stiffer and the other radially flexible, said beams being inter engageable with opposite radial sides of said slide and rail with a slight circumferential and radial clearance, whereby, each module may be assembled to the other by axially inserting each male fastener slide and rail between each pair of female fastener beams, thereby flexing said beams apart as said barb moves axially past and behind said flexible beam, thereby capturing said slides between said beams with sufficient radial and circumferential clearance to allow said modules to conform to said annular space, while any module may be individually removed from said cage by bending it radially relative to the adjacent modules so as to pry said beams apart and simultaneously moving said module axially out.

3. A modular roller clutch cage that self conforms within an annular space between a pair of clutch races and which may be easily assembled and disassembled, comprising, a plurality of interlocking modules, each module comprising generally a segment of said annular space, each module having a male fastener at one end and a female fastener at the other, each fastener on each module being mutually axially insertable to the mating fastener on each adjacent module, each male fastener comprising a radially stiff slide extending circumferentially from one end of each module, an axially extending, radially thicker rail circumferentially spaced from said module one end and parallel to said slide, and an axially discontinuous barb on said slide that is radially thicker than said slide, each female fastener comprising a pair of undercut beams extending circumferentially from the other end of said module and spaced radially apart by less than the thickness of said slide barb, including a stiff radially inner beam and a longer, flexible, radially outer beam, said beams being inter engageable with opposite radial sides of said slide and rail with a slight circumferential and radial clearance, whereby, each module may be assembled to the other by axially inserting each male fastener slide and rail between each pair of female fastener beams, thereby flexing said beams apart as said barb moves axially past and behind said flexible beam, thereby capturing said slides between said beams with sufficient radial and circumferential clearance to allow said modules to conform to said annular space, while any module may be individually removed from said cage by bending it radially outwardly relative to the adjacent modules so as to pry said beams apart with and simultaneously moving said module axially out.

* * * * *